United States Patent [19]
Giardina et al.

[11] Patent Number: 5,235,798
[45] Date of Patent: * Aug. 17, 1993

[54] METHOD AND APPARATUS FOR LOADING WHOLESTALK CUT SUGAR CANE

[75] Inventors: Jacob Giardina; Kenneth Rodrigue, both of Thibodaux, La.

[73] Assignee: Cameco Industries, Inc., Thibodaux, La.

[*] Notice: The portion of the term of this patent subsequent to Nov. 7, 2006 has been disclaimed.

[21] Appl. No.: 698,246

[22] Filed: May 6, 1991

Related U.S. Application Data

[63] Continuation of Ser. No. 194,807, May 17, 1988, abandoned.

[51] Int. Cl.[5] .................... A01D 61/04; A01D 90/00
[52] U.S. Cl. ...................... 56/16.6; 56/351; 56/DIG. 2
[58] Field of Search ............... 56/16.6, 13.9, DIG. 2, 56/350–353, 341, 344, 345, 14.3, 14.5

[56] References Cited

U.S. PATENT DOCUMENTS

| | | | |
|---|---|---|---|
| 892,289 | 6/1908 | Myers | 56/16.6 |
| 953,329 | 3/1910 | Ginaca | 56/352 X |
| 1,289,169 | 12/1918 | Henderson | 56/351 X |
| 1,459,247 | 6/1923 | Vilar Y Pazos | 56/13.9 |
| 2,669,829 | 2/1954 | Pugh | 56/192 |
| 2,974,464 | 3/1961 | Thornton | 56/16.6 |
| 3,090,183 | 5/1963 | Thompson | 56/1 |
| 3,448,564 | 6/1969 | Chauffe | 56/17 |
| 3,456,429 | 7/1969 | Sexton, Jr. | 56/14.5 X |
| 3,460,324 | 8/1969 | Tolar | 56/16.6 |
| 3,475,886 | 11/1969 | Hart | 56/1 |
| 3,691,742 | 9/1972 | Brewster | 56/351 X |
| 3,851,449 | 12/1974 | Medina | 56/16.6 X |
| 4,380,281 | 4/1983 | Duncan | 198/304 |
| 4,878,341 | 11/1989 | Giardina et al. | 56/364 |
| 4,962,637 | 10/1990 | Giardina et al. | 56/344 |

FOREIGN PATENT DOCUMENTS 211266 7/1984 German Democratic Rep. ... 56/344

OTHER PUBLICATIONS

SP 1800 Four–Wheel–Drive Self Propelled Cane Loader—Cameco, Pub. Nov. 1987.
R-6 Continuous Loader—Cameco.

*Primary Examiner*—Hoang C. Dang
*Attorney, Agent, or Firm*—Pravel, Hewitt, Kimball & Krieger

[57] ABSTRACT

Wholestalk sugar cane loading apparatus includes a movable carriage having fore and aft wheel bases and a basket supported by the carriage generally between the wheel bases and along the longitudinal central axis of the carriage, the basket defining a load carrying surface for holding harvested wholestalk cane in a generally parallel bundle fashion and at an elevational position spaced vertically above the underlying cane field surface.

An inclined transfer device is positioned forward of the basket for movement the during gathering of windrowed wholestalk cane for lifting individual wholestalks of cut cane from a resting position upon the cane field ground surface to an elevated discharge position generally above the load carrying surface of the basket, so that cane stalks discharged by the transfer device can fall into the basket. The transfer device includes a moving endless chain positioned at least under the cane wholestalks for carrying the wholestalks between the resting and discharge positions and wherein the transfer device maintains the cane stalks in a generally parallel position with respect to one another during transfer of the cane stalks from the cane field ground surface to the basket.

16 Claims, 4 Drawing Sheets

METHOD AND APPARATUS FOR LOADING WHOLESTALK CUT SUGAR CANE

This is a continuation of co-pending application Ser. No. 07/194,807 filed on May 17, 1988, now abandoned.

BACKGROUND OF THE INVENTION

1. Field of the Invention

The present invention relates to sugar cane harvesting, and more particularly relates to an improved sugar cane loading method and apparatus wherein cane is lifted upwardly from an initial position on the ground surface of a sugar cane field and discharged at a second elevated position where the cane falls into a receptacle. The cane is maintained in a generally parallel fashion so that it can be off loaded from the receptacle using a cane loader with tines.

2. General Background

In the harvesting of sugar cane, each stalk of cane is cut at the bottom and at the top, creating a cut "wholestalk", and then wholestalks are piled into windrows wherein the cane is piled normal to and between two adjacent rows. In the hand harvesting of sugar cane, each stalk is cut at the bottom and at the top, and some of the time once or twice in the center portion of the stalk. These large sections of cane are still referred to as "wholestalks". Cane wholestalks are piled generally parallel to one another, each stalk extending across the rows of cane, straddling the two rows where the cane was standing and growing.

Several devices have been patented which describe the mechanical methods and apparatus used to harvest cane and to place it in windrows, which are stacks of cane perpendicular to the rows. The Duncan U.S. Pat. No. 4,380,281 for example entitled "Associated Running Gear and Piler Improvement in a Two Row Harvester and Piler" relates to a sugar cane harvester which cuts the cane at its top and bottom and thus produces wholestalks. A wholestalk as used herein refers to a stalk of cane which is cut at its base near the ground, and at its top to remove leaves, but which has not been cut into smaller pieces or "billets". Wholestalk harvesters such as the harvester shown in the Duncan '281 patent cut and then pile the cane in generally parallel fashion, perpendicular to the rows. These harvesters are also known as "soldier" harvesters because the cut cane is maintained in a vertical position, one stalk following the previous stalk (like marching soldiers) often being cut and prior to piling.

U.S. Pat. No. 3,475,886 entitled "Method of Harvesting Sugar Cane" shows a harvester which uses a constant discharge of cut cane to the left hand side of the harvester.

Other examples of cane harvesting and piling equipment include the Pugh U.S. Pat. No. 2,669,829 entitled "Cane Harvesting and Piling Machine" the Thompson U.S. Pat. No. 3,090,183 "Process for Harvesting and Piling Cane", and U.S. Pat. No. 3,448,564 entitled "Cane Harvester". These cane harvester patents are exemplary of various machines that can be used to cut and pile cane and are exemplary of cane harvesting equipment in general. Hand cut cane, also referred to as "wholestalk" cane is handled in the same basic way.

When wholestalk cane has been windrowed, it must then be lifted and placed into trucks for delivery to the sugar cane mill. Several devices are now commercially available which are used to gather and load the cane. These gathering devices are typically referred to as "cane loaders". One of the most common types of loaders is simply a wheeled device which carries a movable boom having opposed grabbing tines at the end of the boom. The tines are usually hydraulically powered and operate much like a crab claw to grab large batches or bundles of the cane. The tines lift the gathered cane up in the air and deposit it into large trucks or trailers.

One of the problems with cane gathering devices is the problem of mixing mud, dirt and rocks with the cane which produces an expensive cleaning problem at the mill. The water which is used to clean the cane of mud becomes a source of water pollution. Thus there is a need for an efficient "clean" cane loader.

Several cane loaders are commercially available. One commercial embodiment of a four wheel drive, self propelled cane loader is the Cameco SP 1,800 manufactured by the assignee of the present invention, Cameco Industries, Inc.. The Cameco SP 1,800 is a hydrostatic drive, self propelled cane loader with an articulated boom mounted on the frame of the loader. The boom includes a forward end portion with a pair of spaced apart powered tines which are hydraulically actuated to open and close.

A commercially available continuous loader is the Cameco model R-6 which uses endless inclined chains mounted on sprockets for lifting the cane stalks from the ground. After the cane is picked up by the chains it is cut into billets. Two blowers and two extractors remove leaves and dirt that was attached to the cane.

Some commercially available loaders use a forwardly inclined scoop in combination with gathering chains to the cane stalks from the ground surface. The scoop includes a forwardly curved rear section which redirects the cane forwardly so that continuous operation of the device tends to roll the cane into an ever increasing bundle which constantly communicates with the scoop. Thus the cane never leaves the scoop until it is ready for loading.

SUMMARY OF THE PRESENT INVENTION

The present invention provides a wholestalk sugar cane loading apparatus for picking up and accumulating windrowed wholestalks from a cane field ground surface, so that the collected wholestalks can be conveniently grabbed and off loaded by powered tines for example. The apparatus includes a moveable preferably wheeled carriage and a basket receptacle which is supported by the carriage. The basket receptacle provides a load carrying surface for holding harvested wholestalk cane in a generally parallel bundle fashion and at an elevational position spaced vertically above the underlying cane field surface.

An inclined cane gathering mechanism includes a series of parallel laterally spaced endless chains which are mounted on sprockets, positioned adjacent the basket. The endless chains are inclined so that one end portion of the chains lift the cane off the ground, and the other end portion of the chains discharges the cane for example in a free fall fashion so that it can fall into the basket receptacle.

The basket receptacle has an elevational position spaced vertically above the underlying ground surface so that when the tines remove cane from the basket they do not dig into the underlying ground surface. This provides a clean, relatively dirt and mud free method and apparatus for lifting cane from the ground surface after it has been cut. With the method and apparatus of the present invention, there is no need to push the cane along the ground into bundles which creates a mud and dirt problem, as the cane mixes with the underlying soil surface and becomes muddy. Muddy cane stalks must be washed extensively before they are suitable for processing by the sugar mill.

In the preferred embodiment, the basket receptacle has multiple spaced bars defining slots therebetween so that the tines of a loader can intersect the slots, allowing the tines to fully encircle the cane in the basket receptacle. In some cases, a plated or solid floor can be used. The plated floor will be scraped by the tines during loading.

In the preferred embodiment, the cane gathering mechanism maintains the cane stalks in a generally parallel position with respect to one another at all times during transfer of the cane stalks from the cane field ground surface to the basket receptacle.

In the preferred embodiment, the carriage is wheeled. However, tracks might lend themselves to adverse field conditions.

In the preferred embodiment, the cane loading boom is mounted on the carriage for vertically lifting a bundle of cane from the basket so that the bundle of cane can be loaded onto a truck or wagon for example.

In the preferred embodiment, the cane gathering mechanism includes a frame supported at least in part by the carriage, and upper and lower moving endless chains defining therebetween a cane travel path while moving the cane stalks between the resting and discharge positions.

In the preferred embodiment, the carriage includes a frame and a plurality of wheels rotatably mounted on the frame including at least front and rear wheels, and the basket is positioned generally between the front and rear wheels.

In the preferred embodiment, there are a plurality of endless lower chains defining an upper plane and a plurality of upper endless chains defining a lower plane position generally parallel to the upper plane, and the cane stalk travel path is defined by the area between the upper and lower planes.

In the preferred embodiment, the basket includes a plurality of generally parallel grate members which are closely spaced and retain the cane stalks in a position generally perpendicular to the plurality of grate members.

In the method of the present invention, cane wholestalks that have been cut and windrowed and which are lying on the cane field ground surface in an initial resting position are gathered by first lifting the cane wholestalks from the initial resting position upwardly along a conveyor path to an elevated discharge position. The cane wholestalks are discharged so that they descend for a time interval. The descending cane stalks are then collected in a receptacle that has a lowermost surface upon which the collected cane rest, the surface being spaced vertically below the cane discharge, and vertically above the surface of the cane field ground surface a sufficient distance so that the gathered cane can be off loaded from the receptacle with tines that do not dig into the underlying cane field ground surface.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1A:
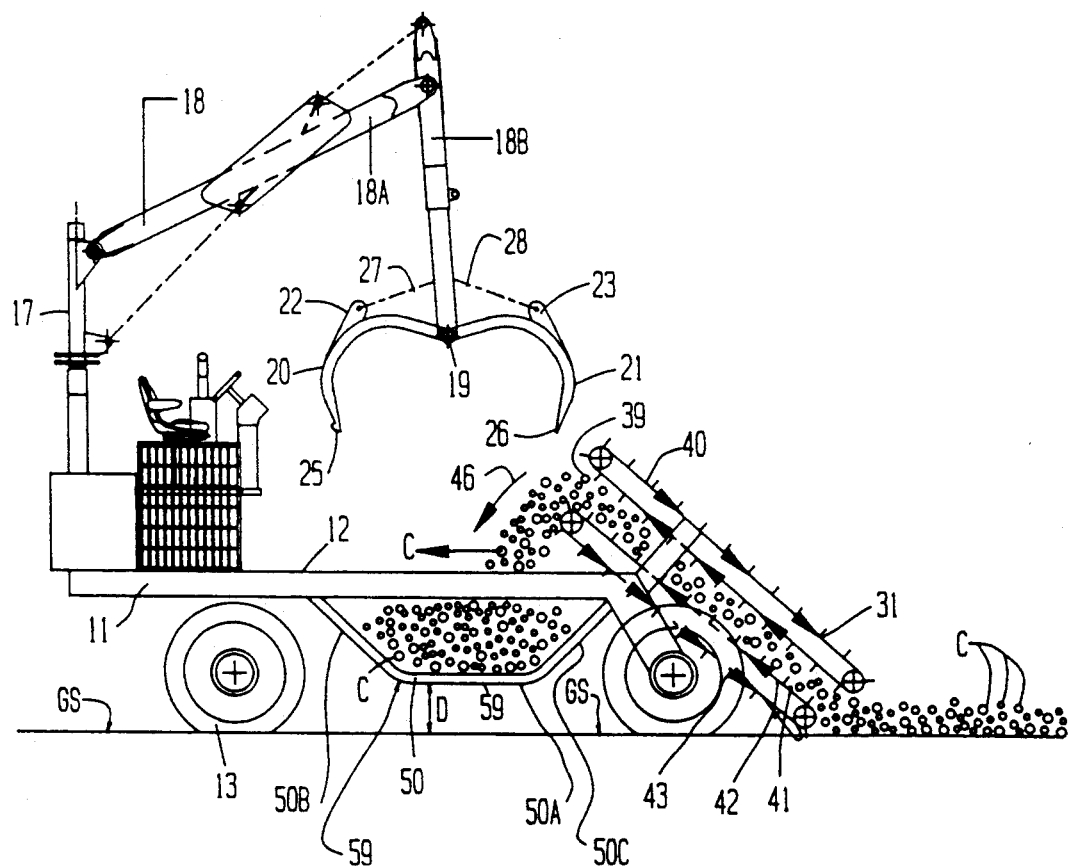
FIG. 1A is a side elevational view of the preferred embodiment of the apparatus of the present invention with the grabbing tines raised.
Figure 1B:
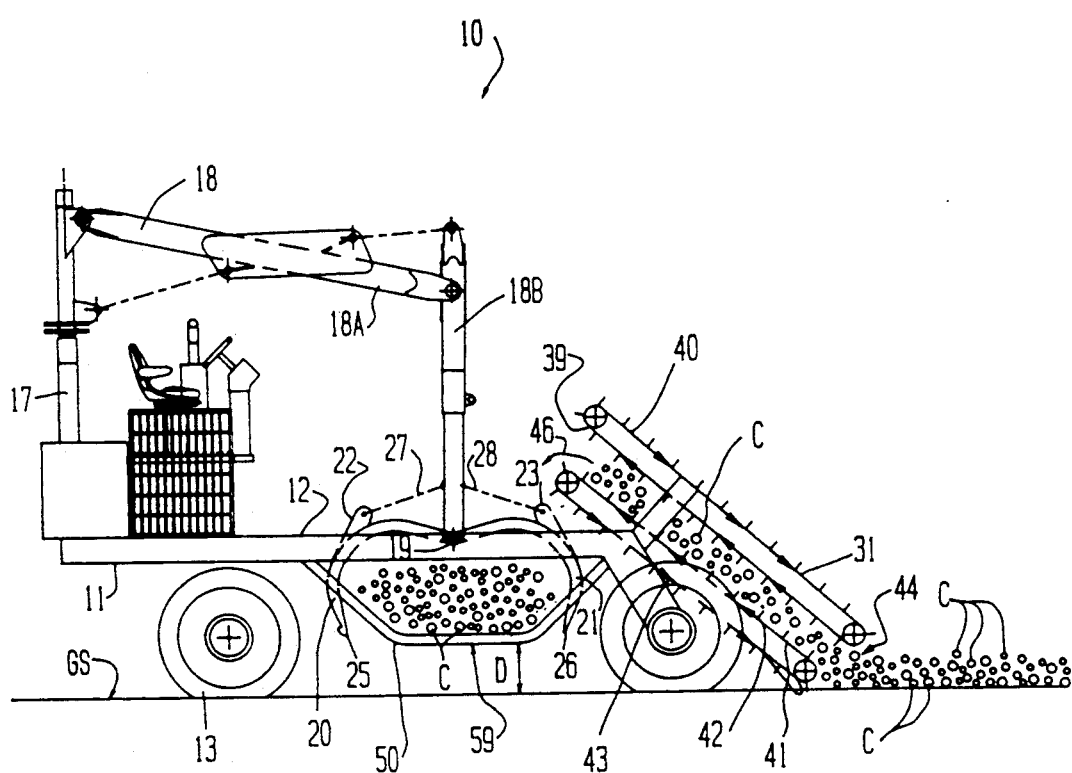
FIG. 1B is a side elevational view of the preferred embodiment of the apparatus of the present invention with the grabbing tines lowered.
Figure 2:
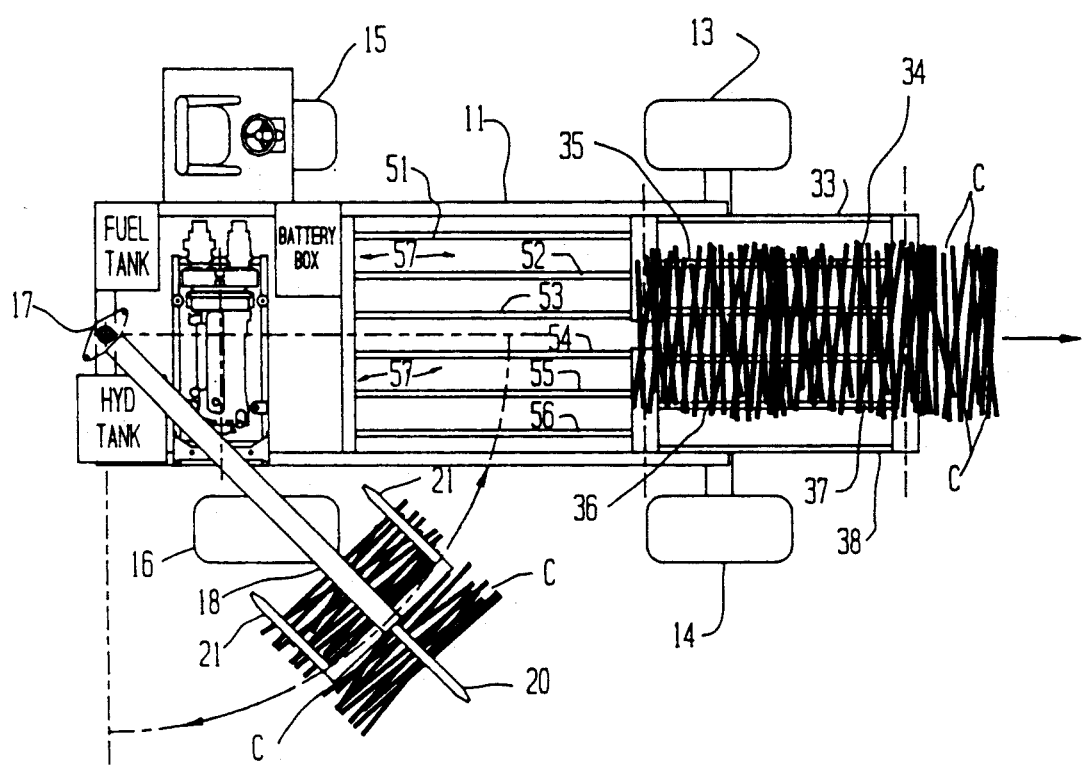
FIG. 2 is a top plan view of the preferred embodiment of the apparatus of the present invention.
Figure 3:
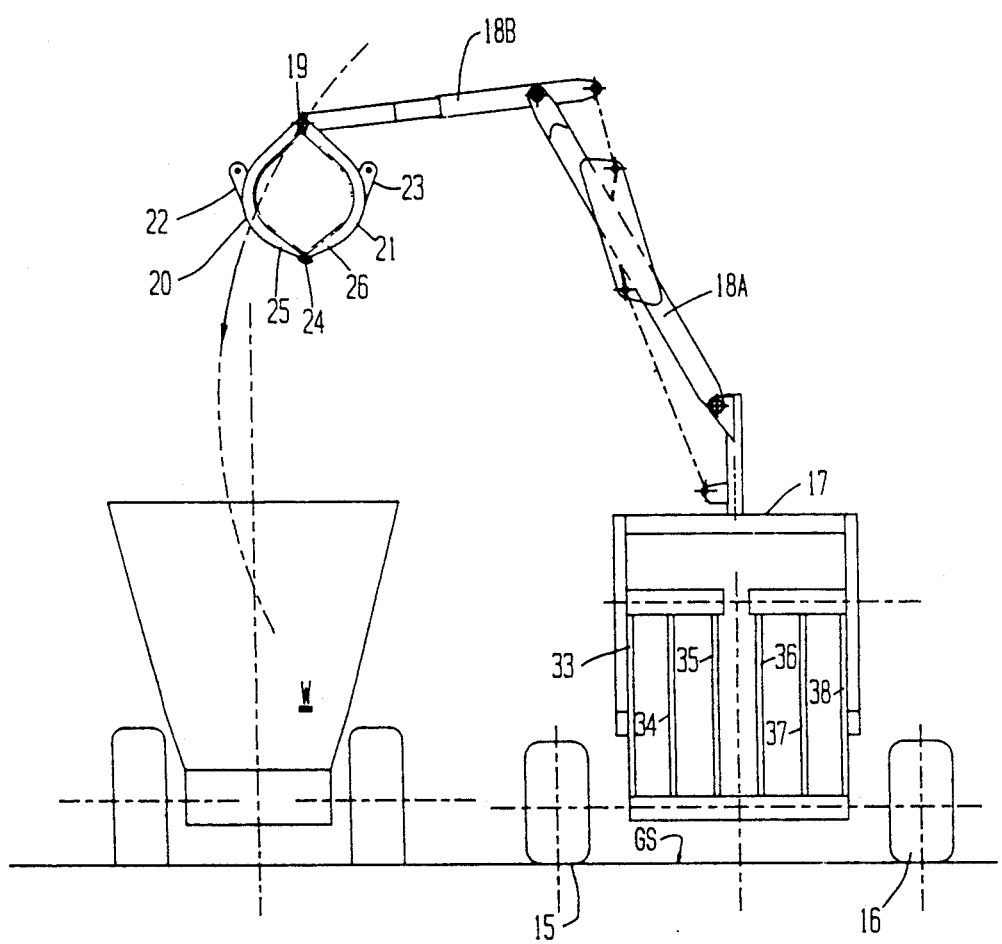
FIG. 3 is an end elevational view of the preferred embodiment of the apparatus of the present invention.

FIGS. 1A-3 illustrate the preferred embodiment of the apparatus of the present invention designated generally by the numeral 10. The cane loading apparatus of the present invention includes a carriage 11, comprised of a frame 12 and a plurality of wheels 13-16. A superstructure 17 supports boom 18 having boom sections 18 A, 18 B. The boom moves in a rotating fashion as well as in an articulating fashion. An articulating joint 19 supports an assembly of tines including tines 20-21. Gussets 22, 23 on each tine 20, 21 respectively as shown on the drawings provide a means for attaching a hydraulic cylinder 27, 28 for operating the tines 20, 21 between an open position as shown in FIGS. 1A and 1B are a closed position as shown in FIG. 3. Hydraulic cylinders 27, 28 are used to open and close the tines and in a powered fashion so that large bundles of cane stalks C can be grabbed and loaded into a wagon such as the wagon W shown in FIG. 3. Of course, the loading could be into any other suitable receptacle such as a railroad car, truck, or the like.

The forward end portion of the carriage 11 provides a cane gathering mechanism designated generally by the numeral 30. Cane gathering mechanism 30 includes an upper 31 and a lower 32 set of endless chains mounted on rotating sprockets, which can include a plurality of laterally spaced endless chains in each assembly 31, 32 such as is shown in FIG. 2. In FIG. 2, the upper gathering assembly 31 shows six laterally spaced endless chains 33-38. A similar, corresponding set of lower, spaced endless chains compresses lower gathering assembly 32. In the upper assembly 31, the chains are moving in the direction as indicated by the arrows so that the underside 39 of the upper chain assembly 31 moves rearwardly while the top return run of each endless chain 33-38 moves forwardly as indicated by the arrows on the upper surface 40 of assembly 31. The surface 39 defines a lower planar surface of the assembly 31.

The lower gathering assembly 32 likewise includes a plurality of laterally spaced endless chain assemblies which define an upper planar surface 41. The direction of movement of the upper surface 41 defined by the chains 15 indicated by the arrows 42 in FIGS. 1A and 1B. The return arrows 43 indicate the direction of the chains on the return run which is the bottom surface of assembly 32. Notice that the inside surfaces which include the bottom 39 of gathering assembly 31 and the top surface 41 of gathering assembly 32 both move rearwardly to lift the cane stalks C rearwardly and upwardly. These two surfaces 39, 41 are generally parallel planar surfaces as seen in FIG. 1 with the cane wholestalks C passing therebetween along a cane travel path that begins at cane intake 44 and ends at cane discharge 45.

The gathered cane wholestalks C fall from discharge 45 as shown by the curved arrows 46 and fall downwardly into basket receptacle assembly 50. Basket receptacle 50 preferably includes a plurality of parallel, spaced grate bars 51-56. The bars are parallel and laterally spaced, having open longitudinal slots 57 therebetween. This spacing and slots allows the tines 20, 21 to pass through the basket assembly 50 in order to completely encircle any cane stalks C in basket receptacle 50 as shown in FIG. 1. The basket receptacle 50 has a flat, horizontal center section 50A and a pair of side angled sections 50B, 50C.

Notice that the bottom 59 of basket assembly 50 is spaced a distance D above the ground surface GS upon which the apparatus 10 rest. Thus, the elevated bottom 59 prevents the tines 25, 26 from digging into the underlying ground surface GS thereby picking up undesireable mud and dirt.

The bottom 59 can be open so that the tines 20, 21 pass through the slots 57. Alternately, the bottom 59 can be plated and solid e.g. by welding metal plate to the bottom side of bars 51-56 creating a floor that can be scraped by the tines during loading.

The use of the gathering assembly 30 allows the cane to be picked up by gathering assembly endless chains neatly, and without pushing the cane or otherwise muddying the cane with the underlying ground surface GS. The cane stalks C harvested by the apparatus 10 of the present invention are very clean and generally free of dirt requiring no extraneous cleaning at the mill. The apparatus of the present invention provides a means for the transfer of the cane wholestalks as gathered by the tines 20, 21 in a clean neat manner which is generally free of dirt and soil. The cane is delivered to the mill in a relatively clean condition.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A wholestalk sugar cane loading apparatus for continuously picking up and accumulating windrowed wholestalks from a cane field ground surface so that the collected wholestalks can be continuously grabbed and off-loaded by a cane loader boom with powered grabbing tines that open and close during grasping of the wholestalks, comprising:
    a) a self-propelled, movable carriage having a longitudinal axis, supported by front and rear, spaced apart, wheel bases;
    b) a basket receptacle, supported by the carriage and positioned generally in front of the rear wheel base, and behind the front wheel base and having a load carrying surface for holding harvested wholestalk cane in a generally parallel bundle fashion within the periphery of the load carrying surface and at an elevational position spaced vertically above the underlying cane field surface, the basket receptacle including a forwardly extending inclined surface that extends toward a position adjacent the forward wheel base and a rearwardly inclined surface that extends toward a position adjacent the aft wheel base;
    c) inclined transfer means, supported by the carriage and positioned forward of the basket receptacle and extending well in front of the front wheel base for movement therewith during gathering of windrowed wholestalk cane that is generally perpendicular to the carriage longitudinal axis, for lifting individual wholestalks of cut cane from a horizontal resting position on the cane field ground surface and in front of the transfer means to an elevated discharge position of the transfer means above the basket receptacle so that cane stalks discharged by the transfer means fall into the basket receptacle, the transfer means including moving endless chain means positioned at least under the cane wholestalks for carrying the whole cane stalks between the said resting and discharge positions;
    d) a can loader boom having a pair of opposed tines, the boom being pivotally mounted on the carriage;
    e) wherein the transfer means enables the cane stalks to be maintained in a generally parallel position with respect to one another during transfer of the cane stalks from the cane field ground surface to the basket means and generally perpendicular to the carriage longitudinal axis, so that the gathered stalks remain generally parallel to the windrowed stalks being gathered; and
    f) the carriage providing an open area above the basket and behind the transfer means so that the powered grabbing tines can freely access the basket when the tines are open or closed.

2. The apparatus of claim 1 wherein the transfer means maintains the cane stalks in a generally parallel position with respect to one another during transfer of the cane stalks from the cane field ground surface to the basket means.

3. The apparatus of claim 1 wherein said cane loading boom means is supported by the carriage at the rear end thereof for vertically lifting a bundle of cane from the basket means.

4. The apparatus of claim 1 wherein the transfer means comprises:
    a) frame supported at least in part by the carriage;
    b) upper and lower moving endless chains defining therebetween a cane path for moving can stalks between the resting and discharge positions.

5. The apparatus of claim 1 wherein the carriage comprises a frame with a longitudinal axis and a plurality of wheels rotatably mounted upon the frame including at least front and rear pair of wheels, and the basket means is positioned along the longitudinal axis and between the front and rear wheels.

6. The apparatus of claim 4 wherein there are a plurality of endless lower chains defining an upper plane and plurality of upper endless chains defining a lower plane positioned generally parallel to the upper plane and the cane.

7. The apparatus of claim 3 wherein the basket means provides a floor that can be scraped by the tines during loading.

8. A wholestalk sugar cane loading apparatus for continuously picking up and accumulating windrowed wholestalks from a cane field ground surface so that the collected wholestalks can be continuously grabbed and loaded by a cane loader boom with powered grabbing tines that open and close during grasping of the wholestalks, comprising:
    a) a movable carriage having a longitudinal axis supported by fore forward and aft wheel bases;

b) basket means, supported by the carriage positioned generally between the fore and aft wheel bases, and having a load carrying surface for holding harvested wholestalk cane in a generally parallel bundle fashion within the periphery of the load carrying surface and at an elevational position spaced vertically above the underlying cane field surface the basket means including a forwardly extending inclined surface that extends toward a position adjacent the forward wheel base and a rearwardly inclined surface that extends toward a position adjacent the aft wheel base;

c) inclined transfer means, positioned forward of the basket means for movement therewith during gathering of windrowed wholestalk cane, for lifting individual wholestalks of cut cane from a resting position on the cane field ground surface to an elevated discharge position above the basket means to that cane stalks discharged by the transfer means can fall into the basket means, the transfer means including moving endless chain means positioned at least under the cane wholestalks for carrying the whole cane stalks between the resting and discharge positions;

d) wherein the transfer means maintains the cane stalks in a generally parallel position with respect to one another during transfer of the cane stalks from the cane field ground surface to the basket means so that the gathered stalks remain generally parallel to the windrowed stalks being gathered;

e) the carriage providing an open area above the basket so that the powered grabbing times can freely access the basket when the tines are open or closed; and f) wherein the basket means comprises a plurality of generally parallel grate members with spaces therebetween.

9. A wholestalk sugar cane loading apparatus for continuously picking up and accumulating windrowed wholestalks from a cane field ground surface so that the collected wholestalks can be continuously grabbed and loaded by a cane loader boom with powered grabbing tines that open and close during grasping of the wholestalks, comprising:

a) a movable carriage having a longitudinal axis supported by fore forward and aft wheel bases;

b) basket means, supported by the carriage positioned generally between the fore and aft wheel bases, and having a load carrying surface for holding harvested wholestalk cane in a generally parallel bundle fashion within the periphery of the load carrying surface and at an elevational position spaced vertically above the underlying cane field surface the basket means including a forwardly extending inclined surface that extends toward a position adjacent the forward wheel base and a rearwardly inclined surface that extends toward a position adjacent the aft wheel base;

c) inclined transfer means, positioned forward of the basket means for movement therewith during gathering of windrowed wholestalk cane, for lifting individual wholestalks of cut cane from a resting position on the cane field ground surface to an elevated discharge position above the basket means to that cane stalks discharged by the transfer means can fall into the basket means, the transfer means including moving endless chain means positioned at least under the cane wholestalks for carrying the whole cane stalks between the resting and discharge positions;

d) wherein the transfer means maintains the cane stalks in a generally parallel position with respect to one another during transfer of the cane stalks from the cane field ground surface to the basket means so that the gathered stalks remain generally parallel to the windrowed stalks being gathered;

e) the carriage providing an open area above the basket so that the powered grabbing times can freely access the basket when the tines are open or closed;

f) cane loading boom means supported by the carriage for vertically lifting a bundle of cane from the basket means; and g) wherein the boom means has a pair of opposed tines for grabbing a bundle of cane wholestalks and the basket means provides spaced open slots through which the tines of the cane loading boom can pass.

10. A method of gathering individual cut cane wholestalks that have been windrowed and are lying on a cane field ground surface in an initial resting position comprising the steps of:

A) lifting the cane wholestalks from the initial resting position upwardly along a moving conveyor that supports each cane wholestalk from below so that the wholestalks ride with the moving conveyor to an elevated discharge position;

B) discharging the cane wholestalks from the moving conveyor so that they descend for a time interval;

C) collecting the descending cane wholestalks in a receptacle that has a lowermost surface upon which the collected cane rests that is spaced above the surface of the cane field ground surface, the receptacle being supported by a carriage; and D) off loading cane wholestalks from the receptacle with a boom pivotally mounted on the carriage, the boom having a pair of opposed tines that can extend a distance below the lowermost surface of the receptacle.

11. The method of claim 10 wherein in step A, the cane wholestalks are lifted by a moving carriage that is propelled along the cane rows.

12. The method of claim 10 wherein in step B, the cane wholestalks free fall for a time interval.

13. The method of claim 10 wherein in step A, the lifted cane wholestalks are lifted upwardly and rearwardly along an inclined path.

14. The method of claim 13 wherein the inclined path is substantially planar.

15. The method of claim 10 wherein in step A, the wholestalks are maintained in a generally parallel position between the resting position and the discharge position.

16. The method of claim 10 wherein in step B, the discharged cane wholestalks all maintained in a generally parallel position.

* * * * *